July 26, 1966  J. H. McAULEY ETAL  3,262,547
FLEXIBLE CHAIN WITH A SHELF PORTION
Filed Jan. 27, 1965
3 Sheets-Sheet 1
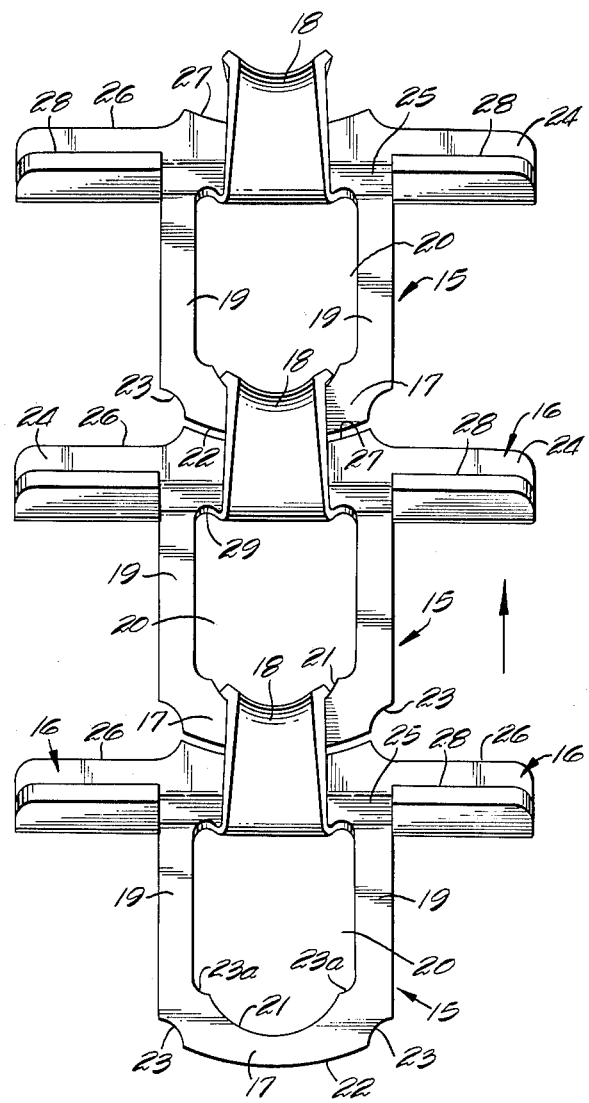
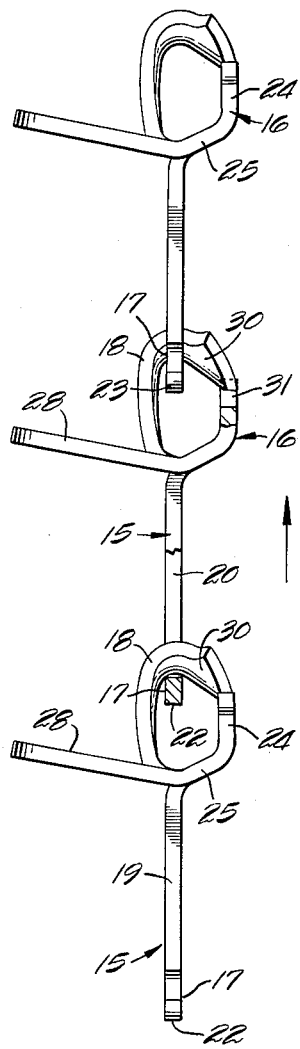
INVENTORS.
JAMES H. McAULEY
THOMAS G. RAUCH
BY MAHONEY, MILLER & RAMBO
ATTORNEYS.

INVENTORS.
JAMES H. McAULEY
THOMAS G. RAUCH
BY MAHONEY, MILLER & RAMBO
BY Wm. V. Miller
ATTORNEYS.

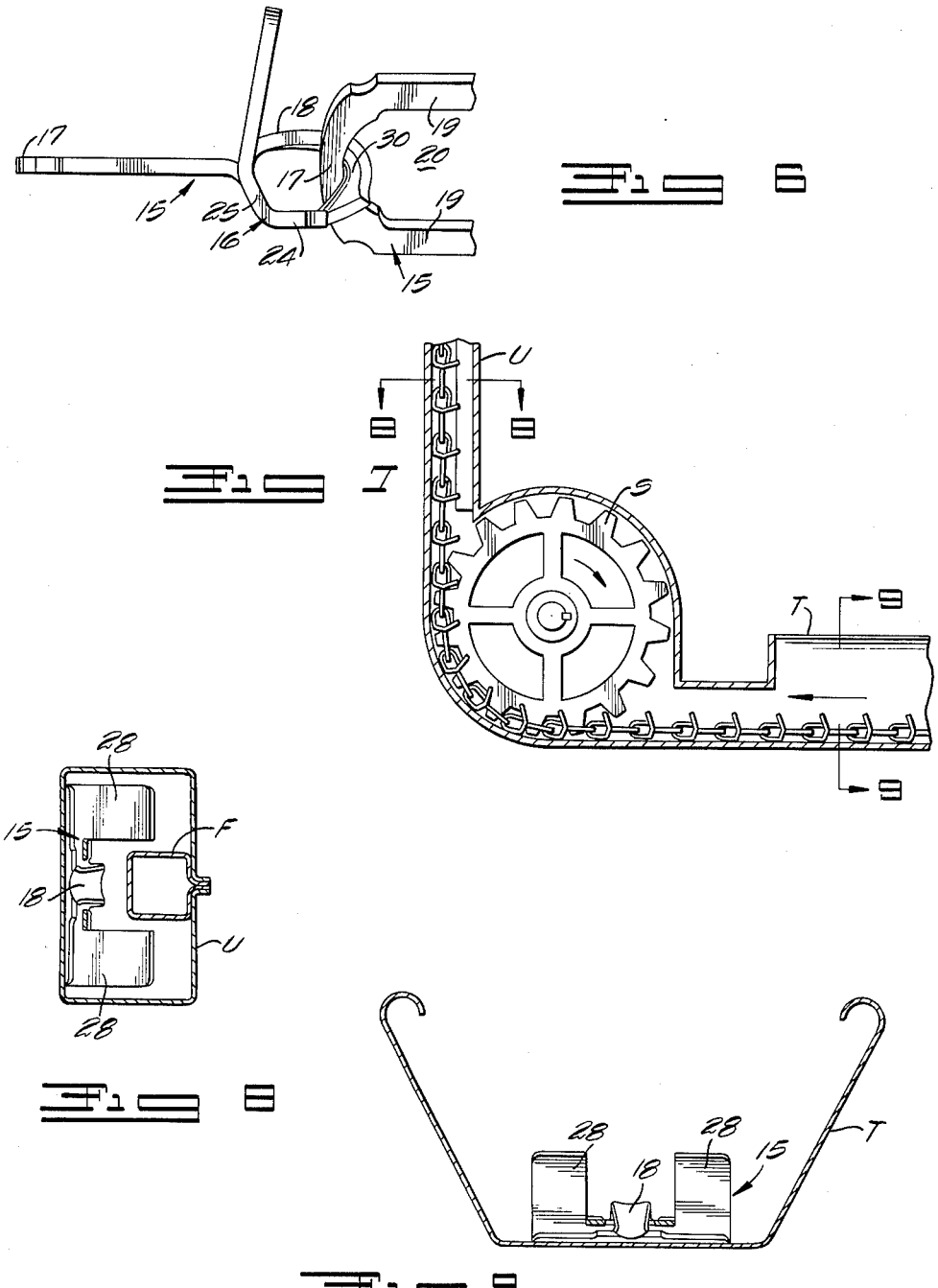

United States Patent Office 3,262,547
Patented July 26, 1966

3,262,547
FLEXIBLE CHAIN WITH A SHELF PORTION
James H. McAuley, Bremen, and Thomas G. Rauch, Lancaster, Ohio, assignors to McAuley Manufacturing, Inc., Bremen, Ohio, a corporation of Ohio
Filed Jan. 27, 1965, Ser. No. 428,300
9 Claims. (Cl. 198—173)

Our invention relates to a material-moving flexible chain. It has to do, more particularly, with a chain which is particularly suitable for moving loose granular material, such as animal or poultry feed, along a feed conduit which has components extending in both horizontal and vertical directions. The chain can also handle, in a conduit or trough, bulky feed or roughage material and can even handle aggregate, sand, etc. This chain is of the general type disclosed in the patent to Graetz et al. No. 2,672,059, issued March 16, 1954, and the patent to McAuley, No. 2,889,915, issued June 9, 1959, but embodies important improvements in structure not disclosed in those patents.

The chain embodying the present invention is composed of interlocking or interfitting links. The construction of the individual links is such that when a plurality of them are hooked together, the resulting chain has the desired degree of flexibility. The chain is especially designed for traveling along an open conduit, such as a trough, having a flat bottom, or through a closed conduit or tube of rectangular cross section. It is sufficiently flexible that it can travel along horizontal and vertical runs of the conduit, or any angle therebetween. The improvements in the present chain are mainly in the structure of the links in order to greatly increase its material-carrying capacity while still maintaining a plowing effect through the material so as not to tend to pack the material in the conduit. This increase is obtained by having a laterally-extending, material-carrying flight on each link which has upstanding material-engaging blades at opposite sides of the link. These flights and associated blades are so formed and positioned on each link of the chain that as the chain advances the blades will provide a plowing effect so that when they engage the material in a conduit they will tend to move the material inwardly onto the flight and body of the link to more effectively carry the material rather than to pack it in the conduit especially if it is operating in a closed cross section tube or conduit. The chain of this invention is formed of links made as simple economical stampings with a minimum waste of material, which can be produced and simultaneously assembled in a low-cost process into any desired chain lengths. Also, although there is no danger of accidental disconnection of links during usage, the links can be disassembled with ease when it is desired to do so.

In the accompanying drawings we have illustrated links and a chain embodying our invention, a blank from which the links can be made, and an example of how the chain can be used.

In these drawings:

FIGURE 1 is a plan view of interlocked links of a length of chain embodying our invention.

FIGURE 2 is an edge elevational view, partly broken away, of the chain section shown in FIGURE 1.

FIGURE 6 is an edge elevational view illustrating how one link may twist relative to the next with which it is interlocked.

FIGURE 7 is a vertical sectional schematic view illustrating an installation in which the chain of this invention includes both horizontal and vertical runs.

FIGURE 8 is an enlarged horizontal transverse sectional view taken along line 8—8 of FIGURE 7.

FIGURE 9 is an enlarged vertical transverse sectional view taken along line 9—9 of FIGURE 7.

Figure 3:
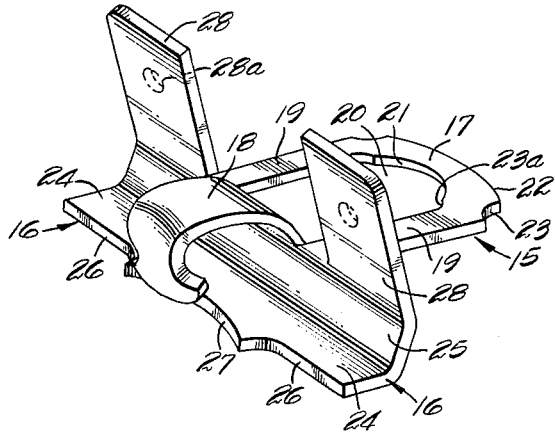
FIGURE 3 is a perspective view of one of the chain links embodying our invention.
Figure 4:
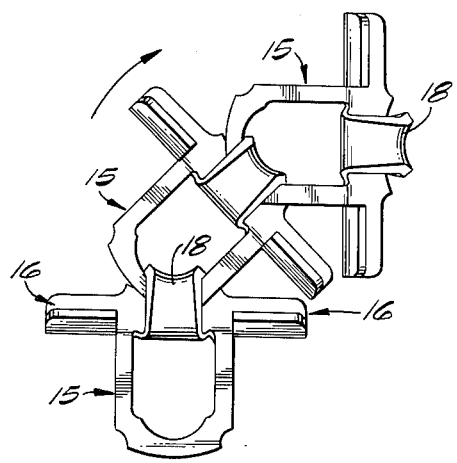
FIGURE 4 is a plan view similar to FIGURE 1 but illustrating how the chain can flex in the main plane of the links.

With reference to the drawings, we have illustrated in FIGURES 1, 2 and 3, a flexible chain composed of the interlocking links 15 which are so connected together that the links may pivot relative to each other at right angles to the plane of travel of the links to facilitate going around a sprocket from a horizontal to a vertical flight as shown in FIGURE 7, may swing relative to each other in the plane of the links to facilitate changing direction of travel in the plane of the chain as shown in FIGURE 4, or may twist relative to each other about the longitudinal axis of the chain, as shown in FIGURE 6 to facilitate passing over particles that may work under one side of the chain between it and the wall of the trough or conduit. An important feature of my present invention is that each link is provided with a transversely-disposed, material-carrying and pushing or plowing flight 16 which will project outwardly from the plane of movement of the chain and also extend transversely thereof so as to support and to engage and push material through the conduit in which the chain operates.

Each of the links 15 takes the form illustrated in the drawings and preferably is produced by a die-cutting and stamping operation. Each link consists of a substantially flat body which has a flat pintle portion 17 at one end and a hook-shaped barrel portion 18 at the other end which are joined together by the two integral flat connecting side portions 19. This arrangement provides a central aperture 20 which will receive a tooth of the driving or supporting sprockets which will be provided for the chain.

The pintle portion 17 is at the rear end of the link relative to its intended direction of travel, as indicated in FIGURES 1 and 2, and is provided with an inner or forward outwardly curved edge 21 and an outer or rear outwardly curved arcuate edge 22. The outer and inner edges of the flat side portions 19 are straight and parallel with each other. Between the curved edge 22 and the outer straight side edges of the side portions 19 are the concave cutouts or notches 23. Directly opposite the notches 23 between the curved edge 21 and the straight inner edges of the side portions 19 are the outwardly curved notches 23a. The forward ends of the flat connecting side portions 19 are connected integrally to the flight 16, as indicated.

The flight 16 is of special form according to our invention to obtain the best material plowing and carrying action. It extends transversely completely across the forward end of the body of the link. It also projects laterally in both directions outwardly beyond the sides of the body of the link, that is beyond the flat side connecting portions 19. It includes a substantially flat leading shelf-like or scoop portion 24, as indicated best in FIGURE 3, which is joined to a laterally coextensive rearwardly and upwardly inclined material-engaging and supporting surface 25. The forward or leading edge of the shelf-like portion 24 is straight at each side, as indicated by the numeral 26, but midway transversely intermediate these straight leading edge portions 26 is a central curved leading edge portion 27. This leading curved edge 27 is concavely or rearwardly curved and is substantially complemental to the rear convex edge 22 of the pintle portion. Upstanding from the upwardly and rearwardly angled material-engaging and supporting surface 25, directly outwardly of the associated side portions 19, material-engaging or pushing blades 28 are provided. These blades are tilted, canted or angled forwardly in the direction of the shelf portion 24, that is in the direction of intended movement of the link over the transversely-extending flight thereof.

The pintle-receiving, hook-shaped barrel portion 18 is formed on the forward end of the body of the link opposite the pintle portion 17 and is shown as being located midway between the forward canted blades 28, extending forwardly and downwardly over the flight 16. It extends forwardly beyond the edge 27 of the shelf 24, then downwardly to the level of the shelf and then rearwardly toward the edge 27 but terminates short thereof to provide a space 31 between the rearwardly directed extremity of the hook and the edge 27. This space is just slightly less than the thickness of the flat pintle portion 17 so that the pintle portion of one link can be turned on edge and slipped through the space 31 into the barrel 18 of the other link. This is facilitated by the curvature of the edge 27. The hook-shaped portion is curved transversely to provide an outer concave surface and an inner convex bearing surface 30. It will be noted that the barrel portion 18 is of substantially less width than the opening 20. Also it will be noted that there are forwardly curved notches 29 between the side portions 19 and the barrel portion 18. As will later appear, the barrel portion 18 is formed from the material removed to produce the opening 20 in the flat body of the link.

Figure 5:
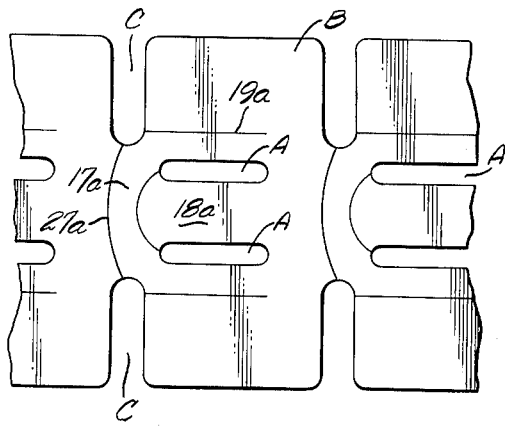
FIGURE 5 is a schematic plan view illustrating a blank from which the chain links can be made.

The chain links of this invention may be stamped from a strip of metal, such as sheet steel, as indicated diagrammatically in FIGURE 5. This figure shows how flat blanks B may be stamped successively from the strip of metal. The only scrap material will be slugs removed at each side of the barrel-forming tongue at the longitudinal slots A so that the barrel 18 of the link will be of substantially less width than the sprocket-opening 20 thereof and at the transverse slots C between the adjacent links at each side of the pintle portion 17a. It will be noted that the pintle portion is separated along a curved slit 27a from the next blank. From one of the flat blanks B of FIGURE 5, the link of FIGURE 3 is formed by shaping the flight 16, by bending it from the flat plane of the blank, which is provided with the pair of parallel longitudinal slits 19a, to form the shelf 24, the angled wall 25 and the blades 28 and to form the barrel 18.

Any suitable length of chain may be made up by interlocking a suitable number of links. One link can be readily interlocked with the next by positioning one link relative to the other so that the pintle 17 will be on edge relative to the shelf 24 of the other and then slipping it through the other into the hook-shaped barrel 18. Similarly by a reverse action, they may be separated. The pintle portions 17 will fit loosely in their associated barrels 18 to permit considerable movement of the links relative to each other in all directions.

The chain may be used for various purposes but is particularly useful for carrying feed, such as animal or poultry feed. An example of its use is shown in FIGURES 7-9 where it is shown with a horizontal run and a vertical run and passing around a sprocket S. This sprocket may be of common form and has teeth which enter the openings 20 of successive links. The horizontal run may pass through an open trough T as indicated in FIGURE 9 and the vertical run may pass through a closed trough as indicated at U in FIGURE 8. The chain will carry the feed along the trough T plowing through it, with the shelf 24 carrying the feed and the forwardly canted blades 28 tending to move the feed down onto the shelf. It may be used for loading what are known as bunk bins which have a larger cross section than it or it may be used for moving feed along troughs having a similar cross-sectional area. From the trough, large or small animals or poultry may have access to the feed. The closed vertical conduit U can be of substantially rectangular form with a filler portion F, so that the cross-sectional space will be substantially filled by the flights of the chain links and the feed will, therefore, be more effectively lifted. Also, an open trough of rectangular cross section substantially filled by that of the chain may be used. The blades 28, since they are canted forwardly, will tend to move the material onto the associated shelf 24 rather than outwardly against the opposite wall of the conduit and cause it to build up thereon and possibly causing jamming of the chain in the conduit. The chain will be kept taut by the sprockets which carry and drive it and the links will align themselves with each other normally as indicated in FIGURE 1 due to the inner concave bearing surfaces 30 on the links which have a centering effect in cooperation with the curved pintle portions 17. Lateral movement of one link is permitted readily relative to the other because the barrels 18 are of less lateral extent than the openings 20. The pintle portions 17 can move in the barrels 18 in which they fit loosely in substantially any direction, such as with a lateral sliding movement as just described, with a rocking movement in a plane at an angle to the plane of movement of the chain as in passing around the sprocket in FIGURE 7, with a lateral turning movement as in FIGURE 4 or with a twisting movement as in FIGURE 6. All these movements are desirable in carrying animal or poultry feed or other feed in various installations. The lateral sliding and lateral flexing movement between links will facilitate travel of the chain around horizontal corners (FIGURE 4) where a guide wheel (not shown) may be provided. Relative rocking of the links in the other plane will facilitate passage from horizontal to vertical runs around a sprocket. Vertical movement of the flat pintle 17 in each barrel 18 will be permitted so that all the flat bodies of successive links will be in the same flat plane as indicated in FIGURE 2. Relative twisting as in FIGURE 6 will permit the flight of a link to ride up over a pebble or the like on the bottom of the trough at one side of the chain without raising the other side of the flight. All relative movements will keep the interlocking joints free of accumulations of materials.

The links described have a high material-carrying capacity relative to their size. However, this can be increased by the addition of flight blade extensions which may be desirable in some instances. For this purpose, the blades 28 may be provided with bolt-receiving holes 28a, as indicated by dotted lines in FIGURE 3 to facilitate attachment of different flight blades thereto. These blades may be of various shapes and sizes, depending on the shape and size of the conduit in which the chain is adapted to operate.

It will be apparent from the above that we have provided a flexible chain which is particularly useful in moving loose-particle material. Many advantages of the chain have been discussed and others will be apparent.

Having thus described this invention, what is claimed is:

1. A chain composed of interlocking links, each of said links comprising a substantially flat body having a pintle portion at its rear end, a transversely-extending material-carrying flight at its forward end, said flight having a transverse shelf portion which extends completely across the body and extends in opposite directions laterally outwardly beyond the extent of the body to provide lateral projections, said laterally-extending flight having a forwardly-directed flat shelf with a forward exposed edge but having a rearwardly and upwardly angled laterally coextensive material-engaging and supporting wall spaced rearwardly from said edge and upstanding material-engaging blades projecting upwardly from said angled wall at each side of said body and tilted forwardly and downwardly toward said flat shelf, and a hook-shaped pintle-receiving barrel portion located transversely midway between said blades and projecting forwardly and downwardly over said shelf.

2. A chain composed of interlocking links, each of said links comprising a substantially flat body having a flat rearwardly-curved pintle portion at its rear end, a transversely-extending material-carrying flight at its forward end, said flight having a transverse shelf portion which extends completely across the body and extends in opposite directions laterally outwardly beyond the extent of the body to provide lateral projections, said laterally-extending flight having a forwardly-directed flat shelf with a forward exposed edge with an inwardly curved mid portion substantially complemental to said curved pintle portion, but having a rearwardly and upward angled, laterally coextensive, material-engaging and supporting wall spaced rearwardly from said edge and upstanding material-engaging blades projecting upwardly from said angled wall at each side of said body and tilted forwardly and downwardly toward said flat shelf, and a hook-shaped pintle-receiving barrel portion located transversely midway between said blades and projecting forwardly beyond the forward edge of said shelf and then downwardly and rearwardly toward said shelf but having an extremity spaced therefrom.

3. A chain according to claim 2 in which the barrel is curved transversely to provide a convex inner bearing surface, the pintle of one link fitting loosely into the barrel of an adjacent link and having a curved inner edge engaging said bearing surface.

4. A chain according to claim 3 in which the body of each link includes side portions connecting the pintle portion and the flight, said side portions being spaced apart laterally a distance greater than the transverse width of said hook-shaped barrel portion so that such portion on one link will hook over the pintle portion of an adjacent link and extend through the space between said side portions and will be free to move laterally in said space.

5. A chain composed of interlocking links, each of said links comprising a substantially flat body having a pintle portion at its rear end, a transversely-extending material-carrying flight at its forward end, said flight having a transverse shelf portion which extends completely across the body and extends in opposite directions laterally outwardly beyond the extent of the body to provide lateral projections, said laterally-extending flight having a forwardly-directed flat shelf with a forward exposed edge but having a rearwardly and upwardly angled laterally coextensive material-engaging and supporting wall spaced rearwardly from said edge and upstanding material-engaging blades projecting upwardly from said angled wall at each side of said body, and a hook-shaped pintle-receiving barrel portion located transversely midway between said blades and projecting forwardly and downwardly over said shelf.

6. A chain composed of interlocking links, each of said links comprising a substantially flat body having a flat rearwardly-curved pintle portion at its rear end, a transversely-extending material-carrying flight at its forward end, said flight having a transverse shelf portion which extends completely across the body and extends in opposite directions laterally outwardly beyond the extent of the body to provide lateral projections, said laterally-extending flight having a forwardly-directed flat shelf with a forward exposed edge with an inwardly curved mid portion substantially complemental to said curved pintle portion, but having a rearwardly and upwardly angled, laterally coextensive, material-engaging and supporting wall spaced rearwardly from said edge and upstanding material-engaging blades projecting upwardly from said angled wall at each side of said body, and a hook-shaped pintle-receiving barrel portion located transversely midway between said blades and projecting forwardly beyond the forward edge of said shelf and then downwardly and rearwardly toward said shelf but having an extremity spaced therefrom.

7. A chain according to claim 6 in which the barrel is curved transversely to provide a convex inner bearing surface, the pintle of one link fitting loosely into the barrel of an adjacent link and having a curved inner edge engaging said bearing surface.

8. A chain according to claim 7 in which the body of each link includes side portions connecting the pintle portion and the flight, said side portions being spaced apart laterally a distance greater than the transverse width of said hook-shaped barrel portion so that such portion on one link will hook over the pintle portion of an adjacent link and extend through the space between said side portions and will be free to move laterally in said space.

9. In a chain composed of interlocking links where each of said links comprises a substantially flat body having a pintle portion at its one end, and a hook-shaped pintle-receiving barrel portion at its other end; the improvement which comprises a transverse shelf at said other end of said body at a level below the plane of said body, said shelf extending completely across said body in opposite directions laterally outwardly beyond the extent of the body to provide lateral projections, said shelf being flat and forwardly directed relative to the direction of travel of the chain and having a forward exposed edge, and upstanding material-engaging blades spaced rearwardly from said edge and projecting upwardly above the body from said shelf at each side of said body and said hook-shaped pintle-receiving barrel portion, said barrel portion being located transversely midway between said blades and over said shelf.

References Cited by the Examiner
UNITED STATES PATENTS

| | | | |
|---|---|---|---|
| 2,889,915 | 6/1959 | McAuley | 198—176 |
| 3,215,256 | 11/1965 | McAuley | 198—168 |

EVON C. BLUNK, *Primary Examiner.*

R. E. KRISHER, *Assistant Examiner.*